(12) United States Patent
Yang

(10) Patent No.: US 12,309,844 B2
(45) Date of Patent: May 20, 2025

(54) RANDOM ACCESS METHOD AND APPARATUS

(71) Applicant: GUANGDONG OPPO MOBILE TELECOMMUNICATIONS CORP., LTD., Guangdong (CN)

(72) Inventor: Ning Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 419 days.

(21) Appl. No.: 17/859,459

(22) Filed: Jul. 7, 2022

(65) Prior Publication Data

US 2022/0346154 A1 Oct. 27, 2022

Related U.S. Application Data

(63) Continuation of application No. PCT/CN2020/073114, filed on Jan. 20, 2020.

(51) Int. Cl.
*H04W 74/0833* (2024.01)
(52) U.S. Cl.
CPC .............. *H04W 74/0833* (2013.01)
(58) Field of Classification Search
CPC ................................................ H04W 74/0833
See application file for complete search history.

(56) References Cited

U.S. PATENT DOCUMENTS

| 12,127,270 B2 * | 10/2024 | Rune ................. H04W 74/0866 |
| 2018/0110074 A1 * | 4/2018 | Akkarakaran ........ H04W 72/21 |
| 2021/0099942 A1 * | 4/2021 | Tripathi ............ H04W 36/0058 |
| 2021/0136827 A1 * | 5/2021 | Xiong ................. H04L 5/0094 |

(Continued)

FOREIGN PATENT DOCUMENTS

| CN | 108243391 A | 7/2018 |
| CN | 110475378 A | 11/2019 |

(Continued)

OTHER PUBLICATIONS

Extended European Search Report for European Application No. 20916087.8 issued Dec. 13, 2022. 10 pages.

(Continued)

*Primary Examiner* — Parth Patel
(74) *Attorney, Agent, or Firm* — PERKINS COIE LLP

(57) ABSTRACT

Disclosed are a random access method and apparatus. The method comprises: acquiring configuration information of a network device; acquiring position information of same relative to a target device; and according to the configuration information and the position information, determining a random access type and initiating random access. According to configuration information of a network device and position information of same relative to a target device, a random access type is determined and random access is initiated. Accordingly, a terminal device selects, according to the configuration information and the position information, a suitable random access type for random access, thereby effectively guaranteeing the random access performance of the terminal device, improving the user experience, and solving the technical problem of poor random access performance.

11 Claims, 3 Drawing Sheets

(56) References Cited

U.S. PATENT DOCUMENTS

| | | | |
|---|---|---|---|
| 2022/0103226 A1* | 3/2022 | Huang | H04B 7/0695 |
| 2022/0210845 A1* | 6/2022 | Ko | H04W 74/0866 |
| 2022/0240326 A1* | 7/2022 | Rune | H04W 56/001 |
| 2022/0248475 A1* | 8/2022 | Lee | H04W 74/0841 |
| 2022/0272760 A1* | 8/2022 | Murray | H04W 74/0833 |
| 2022/0287107 A1* | 9/2022 | Kim | H04W 72/0446 |
| 2022/0346154 A1* | 10/2022 | Yang | H04W 74/0833 |
| 2023/0217504 A1* | 7/2023 | Xiong | H04W 74/0891 370/329 |
| 2024/0089931 A1* | 3/2024 | Pan | H04B 7/06966 |
| 2024/0098794 A1* | 3/2024 | Farag | H04L 5/0053 |
| 2024/0314848 A1* | 9/2024 | Xiong | H04L 5/0094 |

FOREIGN PATENT DOCUMENTS

| | | |
|---|---|---|
| EP | 3565302 A1 | 11/2019 |
| WO | 2018132843 A1 | 7/2018 |

OTHER PUBLICATIONS

LG Electronics Inc. "Criteria for 2-step RACH selection" R2-1906580; 3GPP TSG-RAN WG2 Meeting #106; Reno, USA; May 13-17, 2019. 3 pages.

International Search Report Mailed Oct. 21, 2020 In Application No. PCT/CN2020/073114, 4 pages.

Zte, 4-step random access procedure, 3GPP TSG RAN WG1 #89 Meeting, R1-1707049, Hangzhou, P.R. China, May 15-19, 2017, 15 pages.

Qualcomm, Signaling aspect of prioritized random access, 3GPP TSG-RAN WG2 Meeting #101, R2-1803568, Athens, Greece, Feb. 26-Mar. 2, 2018, 5 pages.

Written Opinion mailed Oct. 21, 2020 in Application No. PCT/CN2020/073114, 10 pages.

* cited by examiner

RANDOM ACCESS METHOD AND APPARATUS

CROSS-REFERENCE TO RELATED APPLICATION

The present application is a continuation application of International PCT Application No. PCT/CN2020/073114, filed on Jan. 20, 2020, the entire content of which is hereby incorporated by reference.

TECHNICAL FIELD

The present application relates to the field of communication technologies, in particular to a random access method and apparatus.

BACKGROUND

In an NR (New Radio) system, a Reference Signal Received Power (RSRP) when a terminal device (User Equipment, UE) is in a center of a cell is obviously higher than a RSRP when it is at an edge of the cell, and there is an obvious "distance effect." Therefore, the random access type selection may be performed based on RSRP measurement, and the terminal device can determine its own channel state through the RSRP measurement. When the channel state is better, a two-step random access may be used to reduce the network delay.

In an NTN (Non-Terrestrial Network) system, a corresponding RSRP difference is not obvious for a terminal device at a center of a cell and a terminal device at an edge of the cell. If the current RSRP measurement is used to select the random access type, on the one hand, it is difficult to set an appropriate RSRP threshold for random access type selection; on the other hand, due to an error of RSRP measurement, it is likely that the terminal device will select an inappropriate random access type, which will seriously affect the user experience. Therefore, there is a technical problem of poor random access performance.

SUMMARY

The present application provides a random access method and apparatus to solve the technical problem of poor random access performance.

In a first aspect, a specific embodiment of the present application provides a random access method, applied to a terminal device, including: acquiring configuration information of a network device; acquiring position information relative to a target device; and determining, according to the configuration information and the position information, a random access type and initiating a random access.

In a second aspect, a specific embodiment of the present application provides a random access method, applied to network device, including: sending configuration information to a terminal device, wherein the configuration information is used for the terminal device to determine a random access type and initiate a random access.

In a third aspect, a specific embodiment of the present application provides a random access apparatus, including: an acquiring module, configured to acquire configuration information of a network device; the acquiring module is further configured to acquire position information relative to a target device; and a determining module, configured to, according to the configuration information and the position information, determine a random access type and initiate a random access.

In a fourth aspect, a specific embodiment of the present application provides a random access apparatus, including: a sending module, configured to send configuration information to a terminal device, wherein the configuration information is used for the terminal device to determine a random access type and initiate a random access.

In a fifth aspect, a specific embodiment of the present application provides a terminal device, which includes a processor and a memory, wherein the memory stores a transmission program that may be runnable on the processor, and when the processor executes the program, any one of the above random access methods is performed.

In a sixth aspect, a specific embodiment of the present application provides a computer-readable storage medium in which a computer program is stored, wherein when the computer program is executed, any one of the above random access methods is performed.

In a seventh aspect, a specific embodiment of the present application provides a computer program product, which is stored in a non-transitory computer-readable storage medium, and when the computer program is executed, any one of the above random access methods is performed.

In an eighth aspect, a specific embodiment of the present application provides a chip, which includes a processor configured to call and run a computer program from a memory to enable an apparatus installed with the chip to perform any one of the above random access methods.

In a ninth aspect, a specific implementation of the present application provides a computer program, wherein when the computer program is executed, any one of the above random access methods is performed.

Technical solutions provided by the specific embodiments of the present application may include the following beneficial effects: configuration information of a network device is acquired; position information relative to a target device is acquired; and according to the configuration information and the position information, a random access type is determined and a random access is initiated. According to configuration information of the network device and position information relative to the target device, a random access type is determined a random access is initiated. Accordingly, a terminal device selects, according to the configuration information and the position information, a suitable random access type for the random access, thereby effectively guaranteeing the random access performance of the terminal device, improving the user experience, and solving the technical problem of poor random access performance.

It should be understood that the above general description and the following detailed description are just exemplary and do not limit the present application.

BRIEF DESCRIPTION OF DRAWINGS

The accompanying drawings herein are incorporated in this specification, constitute a part of this specification, illustrate specific embodiments in accordance with the present application, and together with the specification serve to explain principles of the present application.

DETAILED DESCRIPTION

Implementations of exemplary embodiments will be described in detail herein, examples of which are shown in the accompanying drawings. When the following description relates to the drawings, unless otherwise stated, the same numbers in different drawings indicate the same or similar elements. Embodiments described in the following exemplary specific embodiments do not represent all embodiments consistent with specific embodiments of the present application. Rather, they are merely examples of methods and apparatuses consistent with some aspects of the present application as detailed in the appended claims. According to the specific embodiments of the present application, all other specific embodiments achieved by a person of ordinary skill in the art without making inventive efforts are within the protection scope of the present application.

Figure 1:
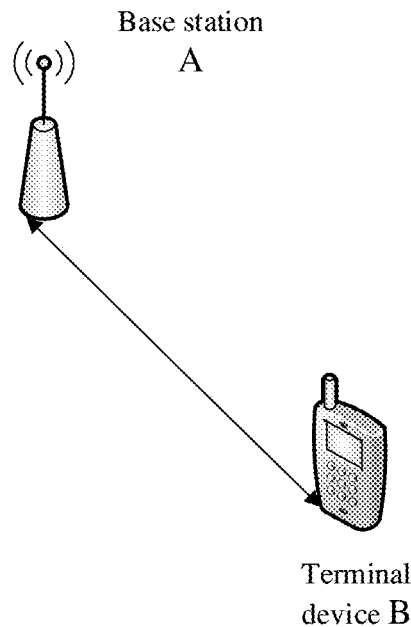
FIG. 1 is a diagram of a network architecture of a communication system to which a specific embodiment of the present application may be applied.

FIG. 1 is a system architecture of a communication system to which the following specific embodiments of the present application may be applied. The system architecture includes a base station A and a terminal device B.

An NTN system generally adopts satellite communication to provide communication services to terrestrial users. Compared with terrestrial cellular network communication, satellite communication has many unique advantages. First of all, satellite communication is not limited by user area. For example, general land communication cannot cover areas such as oceans, mountains, deserts, etc., where communication equipment cannot be set up or communication coverage is not done due to sparse population. For satellite communication, because one satellite can cover a large land area and orbit around the earth, theoretically, every corner on the earth can be covered by the satellite communication. Secondly, satellite communication has great social value. The satellite communication can cover impoverished and underdeveloped countries or regions at low costs, thereby allowing people in these regions to enjoy advanced voice communication and mobile Internet technology. It is conducive to narrowing the digital gap with developed regions and promoting the development of these regions. Thirdly, the satellite communication distance is long, and the communication cost does not increase significantly with the increase of communication distance. Finally, satellite communication has high stability and is not limited by natural disasters.

Communication satellites are classified as LEO (Low-Earth Orbit) satellites, MEO (Medium-Earth Orbit) satellites, GEO (Geostationary Earth Orbit) satellites, HEO (High Elliptical Orbit) satellites and so on according to different orbital altitudes. At present, LEO and GEO are mainly studied.

In order to ensure the satellite's coverage and improve system capacity of the whole satellite communication system, the satellite use multi-beam to cover the land. One satellite may form dozens or even hundreds of beams to cover the land, wherein each satellite beam may cover a land area with a diameter of tens to hundreds of kilometers.

The four-step random access process in NR system is mainly triggered by the following events:

Terminal device B establishes wireless connection when it is initially accessed, the terminal device B switches from RRC_IDLE (idle) state to RRC_CONNECTED (connected) state.

RRC (Radio Resource Control) connection reconstruction process, that is for the terminal device B to reconstruct the wireless connection after the wireless link fails.

Handover, the terminal device B needs to establish uplink synchronization with a new cell.

Under the RRC_CONNECTED state, DL (Downlink) data arrives, and UL (Uplink) is in the out of step state at this time.

Under the RRC_CONNECTED state, UL data arrives, and UL is in the out-of-step state or has no PUCCH (Physical Uplink Control Channel) resource for sending SR (Scheduling Request) at this time.

SR failure.

Synchronous reconfiguration request from RRC.

UE switches from RRC INACTIVE state to RRC_CONNECTED state.

Time calibration is established during SCell (Secondary Cell) addition.

Request additional SI (System Information).

Beam failure recovery.

In NR Rel-15 (Release 15), the following two random access modes are mainly supported, namely, a contention-based random access mode and a non-contention-based random access mode.

The contention-based random access process is divided into four steps, and the non-contention-based random access process is divided into two steps. Detailed steps are as follows:

1. A terminal device sends Msg1 (message1) to a network (base station A).

The terminal device B selects a PRACH (Physical Random Access Channel) resource and sends a selected preamble on the selected PRACH. If it is a non-contention-based random access, the PRACH resource and preamble may be specified by base station A. Base station A may estimate an uplink timing based on preamble and a grant size required by the terminal to transmit Msg3 (message 3).

2. The network sends RAR (Random Access Response) to the terminal.

After the terminal device B sends the Msg1, a random access response time window ra-ResponseWindow is started, and PDCCH (Physical Downlink Control Channel) scrambled by RA-RNTI (Random Access Radio Network Temporary Identifier) is monitored in the time window. The calculation of RA-RNTI is as follows:

$$RA\text{-}RNTI=1+s\_id+14 \times t\_id+14 \times 80 \times f\_id+14 \times 80 \times 8 \times ul\_carrier\_id$$

That is, the RA-RNTI is related to the PRACH time-frequency resource used by the terminal device B to send the Msg1.

After successfully receiving the PDCCH scrambled by RA-RNTI, the terminal device B can obtain the PDSCH (Physical Downlink Shared Channel) scheduled by the PDCCH, which includes RAR, and the RAR specifically includes the following information: the subheader of the RAR includes BI (Backoff Indicator), which indicates backoff time of retransmitting the Msg1; RAPID (Random Access Preamble Identifier) in RAR: that is used for the network to respond to a preamble index received; the payload of the RAR includes TAG (Timing Advance Group), which is used to adjust the uplink timing; UL grant: that is uplink resource indication for scheduling Msg3; and temporary C-RNTI (Cell Radio Network Temporary Identifier): that is used for scrambling PDCCH (initial access) of the Msg4 (message4, fourth message).

If the terminal device B receives the PDCCH scrambled with RA-RNTI and the RAR includes a preamble index sent by the terminal device B itself, the terminal device B considers that the random access response is successfully received.

For the non-contention-based random access, the random access process ends after the terminal device B successfully receives Msg2. For the contention-based random access, the terminal device B needs to continue transmitting Msg3 and receiving Msg4 after successfully receiving Msg2.

3. The terminal device transmits Msg3 on a network scheduling resource

Msg3 is mainly used to inform the network of what event triggering the RACH (Random Access Channel) procedure. For example, if the event is an initial access random procedure, the ID (identification) and establishment cause of the terminal device B will be carried in the Msg3. If the event is RRC reconstruction, the connected terminal device ID and the establishment cause will be carried.

4. The network sends a Msg4 to the terminal device.

The Msg4 has two functions; one is for contention resolution; and the other for the network to transmit an RRC configuration message to the terminal. There are two ways for the contention resolution. One way is that if the terminal device B carries C-RNTI in the Msg3, Msg4 is scheduled with PDCCH scrambled by C-RNTI. The other way is that if the terminal device B does not carry C-RNTI in the Msg3, such as initial access, Msg4 uses PDCCH scheduling scrambled by TC-RNTI (Temporary Cell Radio Network Temporary Identifier). The conflict resolution is that the terminal device B receives PDSCH of Msg4 and matches CCCH (Common Control Channel) SDU (Service Data Unit) in the PDSCH.

In NR Rel-16 (Release 16), a two-step random access procedure is introduced, which can reduce the delay and signaling overhead. MsgA (messageA) in the two-step random access includes preamble transmitted on PRACH and load information transmitted on PUSCH. After MsgA transmission, the terminal device B monitors a response from the network side in a configured window. If the terminal device B receives an indication of successful contention resolution from the network, the terminal device B ends the random access procedure. If a backoff indication is received in MsgB (B message, messageB), the terminal device B executes the transmission of Msg3 and monitors the contention resolution result. If contention resolution is unsuccessful after Msg3 transmission, the terminal device B continues the MsgA transmission.

After the two-step random access procedure is introduced, if the network is configured with a MsgA resource for the two-step random access and a RACH resource for the four-step random access at the same time, for a contention-based random access, the terminal device B first selects a random access type before performing the random access. At present, a conclusion of NR standardization is that the terminal device B selects the random access type based on RSRP measurement. When the RSRP measured by the terminal device B is higher than the RSRP threshold configured by the network, the terminal device B uses the two-step random access; otherwise, the terminal device B uses the four-step random access.

In an NTN (Non-Terrestrial Network) system, a corresponding RSRP difference is not obvious for a terminal device at a center of a cell and a terminal device at an edge of the cell. If the current RSRP measurement is used to select the random access type, on the one hand, it is difficult to set an appropriate RSRP threshold for random access type selection; on the other hand, due to an error of RSRP measurement, it is likely that the terminal device will select an inappropriate random access type, which will seriously affect the user experience. Therefore, there is a technical problem of poor random access performance.

The following specific embodiments of the application will describe in detail how to select a suitable random access type for the random access, effectively ensuring the random access performance of the terminal device, thereby solving the technical problem of poor random access performance.

In the system architecture, the exemplary communication system may be a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (1-DD) system, an LTE Time Division Duplex (TDD) system, an Advanced long term evolution (LTE-A) system, a New Radio (NR) system, an evolution system of an NR system, an LTE-based access to unlicensed spectrum (LTE-U) system, a New Radio based access to unlicensed spectrum (NR-U) system, a Universal Mobile Telecommunication System (UMTS), a Worldwide Interoperability for Microwave Access (WiMAX) communication system, Wireless Local Area Networks (WLAN), Wireless Fidelity (WiFi), Non-Terrestrial Network (NTN), a next generation communication system, or other communication systems.

A User terminal related in specific embodiments of the present application may include various devices with wireless connection functions, such as a handheld device, a vehicle-mounted device, a wearable device, a computing device, or another processing device connected to a wireless modem, and various forms of User Equipment (UEs), Mobile Stations (MSs), terminal devices, and the like. For convenience of description, the above-mentioned devices are collectively referred to as terminal device.

In addition, the terms "system" and "network" are often used interchangeably herein. The term "and/or" herein describes an association relation between associated objects only, indicating that there may be three relations, for example, A and/or B may indicate three cases: A alone, both A and B, and B alone. In addition, the symbol "I" herein generally indicates that there is an "or" relationship between associated objects before and after "/".

It should be understood that in the specific embodiments of the present application, "B corresponding to A" indicates that B is associated with A, and B may be determined according to A. However, it should be further understood that determining B according to A does not mean that B is determined according to A only, and B may be determined according to A and/or other information.

Figure 2:
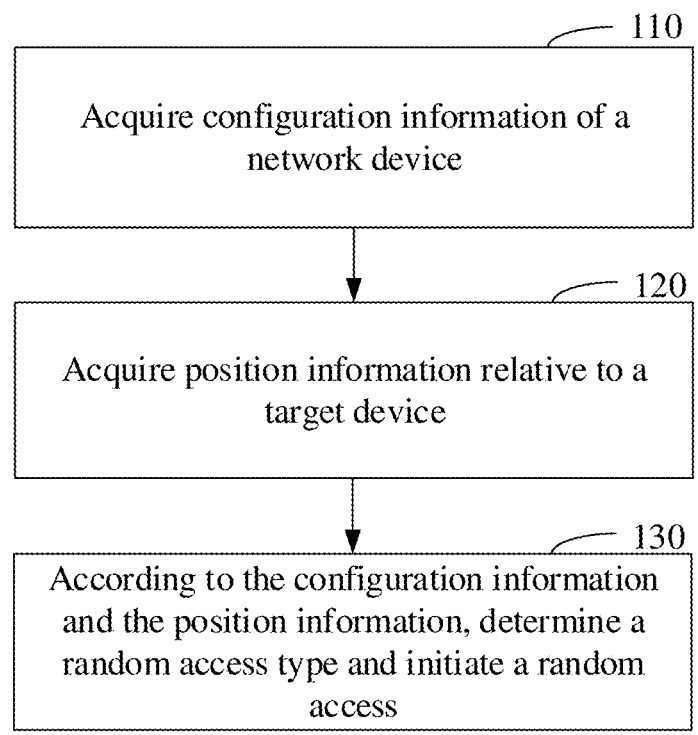
FIG. 2 is a schematic flowchart of a random access method according to a first specific embodiment of the present application.

FIG. 2 is a schematic flowchart of a random access method according to a first specific embodiment of the present application. As shown in FIG. 2, the random access method is applied to a terminal device, and may include the following acts.

In act 110, configuration information of a network device is acquired.

In act 120, position information relative to a target device is acquired.

In act 130, according to the configuration information and the position information, a random access type is determined and random access is initiated.

The configuration information of the network device and the position information relative to the target device are acquired, the random access type is determined according to the configuration information and the position information, and the random access is performed based on the random access type to be used.

Optionally, the act 110 includes the act of acquiring a resource configuration for a two-step random access and a resource configuration for a four-step random access.

Optionally, the acquired configuration information of the network device may include one or more ground reference points and a first threshold.

The act 120 may include the act of measuring one or more distance from the terminal device to the one or more ground reference points.

Optionally, the act 130 may include the following act 131.

In act 131, when it is determined that the configuration information does not include a resource of a non-contention-based random access, a contention-based random access type is determined and the random access is performed according to the one or more distance from the terminal device to the one or more ground reference points.

Optionally, the act 131 may include: initiating a contention-based two-step random access if it is determined that a distance from the terminal device to at least one ground reference point acquired in the position information is not greater than the first threshold; and initiating a contention-based four-step random access if it is determined that a distance from the terminal device to each of all ground reference points acquired in the position information is greater than the first threshold.

Herein, the configuration information may include one or more ground reference points and a first threshold value. One or more ground reference points may be configured in the configuration information, and at least one ground reference point is required to be configured. For each of the one or more ground reference points configured, a corresponding first threshold value is configured, wherein the first threshold value is used by the terminal device to select a random access type. The terminal device selects the random access type based on the distance(s) from the terminal device to the ground reference point(s).

The terminal device measures one or more distance from itself to the one or more ground reference points configured. When it is determined that the configuration information does not include a resource of a non-contention-based random access, a contention-based random access type is determined according to the one or more distance from the terminal device to the one or more ground reference points and the random access is initiated.

A contention-based two-step random access is initiated if the terminal device determines that the at least one distance from the terminal device to at least one ground reference point acquired in the position information is not greater than the first threshold.

A contention-based two-step random access is initiated if the terminal device determines that a distance from the terminal device to each of all ground reference points acquired in the location information is greater than the first threshold.

Optionally, the acquired configuration information of the network device further includes: a first reference distance and a second threshold.

The random access method may include the following acts:

In act 140, a first Reference Signal Received Power (RSRP) value is measured.

In act 150, a contention-based random access type is determined and a random access is initiated based on the one or more distances from the terminal device to one or more ground reference points, the first reference distance, and the first RSRP value.

Optionally, the act 150 may include: determining a distance difference between the one or more distances from the terminal device to the one or more ground reference points and the first reference distance; initiating a contention-based two-step random access if it is determined that a product of at least one distance difference value and the first RSRP value is greater than the second threshold; and initiating a contention-based four-step random access if it is determined that a product of each of all the distance difference values and the first RSRP value is not greater than the second threshold.

Herein, the configuration information may include a first reference distance and a second threshold value. The terminal device measures a first Reference Signal Reception Power (RSRP) value, determines a contention-based random access type, and initiates a random access based on the one or more distance from the terminal device to one or more ground reference points, the first reference distance, and the first RSRP value. The terminal device selects the random access type based on the distance from the terminal device to the ground reference point in conjunction with RSRP measurement.

A distance difference between the one or more distance from the terminal device to the one or more ground reference points and the first reference distance is determined. A contention-based two-step random access is initiated when the terminal device determines that a product of at least one distance difference value and the first RSRP value is greater than the second threshold. That is, when (d_max−d_measure)*RSRP is greater than the second threshold, the contention-based two-step random access is initiated, d_max is the maximum distance value, and d_measure is the distance from the terminal device to the ground reference point.

A contention-based four-step random access is initiated when the terminal device determines that a product of each of all the distance difference value and the first RSRP value is not greater than the second threshold. That is, when (d_max−d_measure)*RSRP is less than the second threshold, a contention-based four-step random access is initiated, d_max is the maximum distance value, and d_measure is the distance from the terminal device to the ground reference point.

The above is only an example of one formula for determining the contention-based random access type and initiating the random access based on the one or more distances from the terminal device to the one or more ground reference points, the first reference distance and the first RSRP value, other formula expressions are not excluded.

Optionally, the acquired configuration information of the network device further includes: a position index list and a third threshold, wherein the position index list includes a position index list for a two-step random access and/or a position index list for a four-step random access.

The act 120 may include: determining a target position of the terminal device according to satellite ephemeris information.

Optionally, the act 130 may include the following act.

In act 132, when it is determined that the configuration information does not include a resource of a non-contention-based random access, the contention-based random access type is determined and the random access is initiated according to the target position.

Optionally, the act 132 may include: initiating a contention-based two-step random access if it is determined that the target position is located in a position index list for the two-step random access; initiating a contention-based four-step random access if it is determined that the target position is not located in a position index list for the two-step random access; initiating a contention-based four-step random access if it is determined that the target position is located in a position index list for a four-step random access; and initiating a contention-based two-step random access if it is determined that the target position is not located in the position index list for the four-step random access.

Optionally, the act 132 may include: initiating a contention-based two-step random access if it is determined that the target position is located in both the position index list for the two-step random access and the position index list for the four-step random access.

Herein, the configuration information may include a position index list and a third threshold, wherein the position index list includes a position index list for a two-step random access and/or a position index list for a four-step random access. The terminal device determines the target position of the terminal device according to satellite ephemeris information. The terminal device determines a random access type to be used based on the target position at which the terminal device is located and a position index list.

A contention-based random access type is determined and the random access is initiated according to the target position when the terminal device determines that the configuration information does not include a resource of a non-contention-based random access.

A contention-based two-step random access is initiated if it is determined that the target position is located in a position index list for the two-step random access.

A contention-based four-step random access is initiated if it is determined that the target position is not located in a position index list for the two-step random access.

A contention-based four-step random access is initiated if it is determined that the target position is located in the position index list for a four-step random access.

A contention-based two-step random access is initiated if it is determined that the target position is not located in a position index list for a four-step random access.

When it is determined that the target position is located in both the position index list for the two-step random access and the position index list for a four-step random access, it indicates that the terminal device may initiate the contention-based two-step random access or may initiate the contention-based four-step random access. In this case, the terminal device initiates the contention-based two-step random access to reduce the delay of accessing the network.

Optionally, the acquired configuration information of the network device further includes a fourth threshold.

The random access method may include the following acts.

In act 160, a second Reference Signal Reception Power (RSRP) value corresponding to the target position is measured.

In act 170, the contention-based random access type is determined and the random access is initiated based on the target position and the second RSRP value.

Optionally, the act 170 may include: initiating a contention-based two-step random access if it is determined that the target position is located in a position index list for a two-step random access and the second RSRP value is not less than the fourth threshold; initiating a contention-based four-step random access if it is determined that the target position is not located in a position index list for two-step random access or the second RSRP value is less than the fourth threshold; initiating a contention-based four-step random access if it is determined that the target position is located in the position index list for a four-step random access and the second RSRP value is less than the fourth threshold; and initiating a contention-based two-step random access if it is determined that the target position is not located in the position index list for the four-step random access or the second RSRP value is not less than the fourth threshold.

Optionally, the act 170 may include: initiating a contention-based two-step random access if it is determined that the target position is located in both the position index list for the two-step random access and the position index list for the four-step random access and the second RSRP value is not less than the fourth threshold.

The acquired configuration information of the network device further includes: a fourth threshold value. The terminal device measures the second Reference Signal Received Power (RSRP) value corresponding to the target position, and determines the contention-based random access type and initiates the random access according to the target position and the second RSRP value. The terminal device selects the random access type based on the target position of the terminal device and the position index list in conjunction with RSRP measurement.

A contention-based two-step random access is initiated if it is determined that the target position is located in a position index list for two-step random access and the second RSRP value is not less than the fourth threshold.

A contention-based four-step random access is initiated if it is determined that the target position is not located in a position index list for two-step random access or the second RSRP value is less than the fourth threshold.

A contention-based four-step random access is initiated if it is determined that the target position is located in the position index list for the four-step random access and the second RSRP value is less than the fourth threshold.

A contention-based two-step random access is initiated if it is determined that the target position is not located in the position index list for the four-step random access or the second RSRP value is not less than the fourth threshold.

A contention-based two-step random access is initiated if it is determined that the target position is located in both the position index list for the two-step random access and the position index list for the four-step random access and the second RSRP value is not less than the fourth threshold.

Optionally, the position index list is a beam index list or a cell index list, and the target position includes a beam or a cell.

Herein, when multiple beams share a PCI (Physical Cell Identifier), the position index list configured by the network device is a beam index list. In this case, the target position includes a beam. The terminal device determines the target position of the terminal device according to satellite ephemeris information, and can further know which beam it is currently covered by. The terminal device selects a random access type based on a beam index.

When a single PCI is used for each beam independently, the position index list configured by the network device is a cell index list. In this case, the target position includes a cell. The terminal device determines the target position of the terminal device according to satellite ephemeris information, and can further know which cell it is currently covered by. The terminal device selects the random access type based on the cell index.

Optionally, the random access method may include the following act.

In act 180, in a case of initiating a contention-based two-step random access, a Random Access Channel (RACH) resource and a Physical Uplink Shared Channel (PUSCH) resource are selected from a message A (msgA) resource pool of the two-step random access in the configuration information, for msgA transmission; and in a case of initiating a contention-based four-step random access, a RACH resource is selected from a RACH resource pool of the four-step random access in the configuration information, for first message msg1 transmission.

Herein, the msgA resource pool is a resource pool used for initiating a contention-based two-step random access, and the msgA resource pool includes a RACH resource and a PUSCH resource. In the case of initiating the contention-based two-step random access, a RACH resource and a PUSCH resource are selected from the msgA resource pool of the two-step random access in the configuration information, for msgA transmission, so that the contention-based two-step random access is initiated.

The RACH resource pool of the four-step random access is a resource pool used for initiating the contention-based four-step random access. In the case of initiating a contention-based four-step random access, a RACH resource is selected from the RACH resource pool of the four-step random access in the configuration information, for first message msg1 transmission, so that the contention-based four-step random access is initiated.

Optionally, prior to the act 120, the random access method may include the following act.

In act 190, random access is initiated according to the random access type corresponding to the resource of the non-contention-based random access when it is determined that the configuration information includes the resource of the non-contention-based random access.

Optionally, the act 190 may include: initiating the non-contention-based two-step random access when it is determined that the configuration information includes a msgA resource of a non-contention-based two-step random access.

Optionally, the act 190 may include: initiating the non-contention-based four-step random access when it is determined that the configuration information includes a RACH resource of a non-contention-based four-step random access.

Herein, the terminal device initiates the random access according to the random access type corresponding to the resource of the non-contention-based random access when it is determined that the configuration information includes the resource of the non-contention-based random access.

The non-contention-based two-step random access is initiated when it is determined that the configuration information includes a msgA resource of the non-contention-based two-step random access. A RACH resource and a PUSCH resource are selected from a msgA resource pool of the non-contention-based two-step random access in the configuration information, for msgA transmission, so that the non-contention two-step random access is initiated.

The non-contention-based four-step random access is initiated when it is determined that the configuration information includes a RACH resource of the non-contention-based four-step random access. A RACH resource is selected from a RACH resource pool of the non-contention-based four-step random access in the configuration information, for msg1 transmission, so that the non-contention-based four-step random access is initiated.

In the first embodiment, configuration information of a network device is acquired; position information relative to a target device is acquired; and according to the configuration information and the position information, a random access type is determined and a random access is initiated. According to the configuration information of the network device and position information relative to the target device, the random access type is determined and the random access is initiated. Accordingly, the terminal device selects, according to the configuration information and the position information, a suitable random access type for random access, thereby effectively guaranteeing the random access performance of the terminal device, improving the user experience, and solving the technical problem of poor random access performance.

Figure 3:
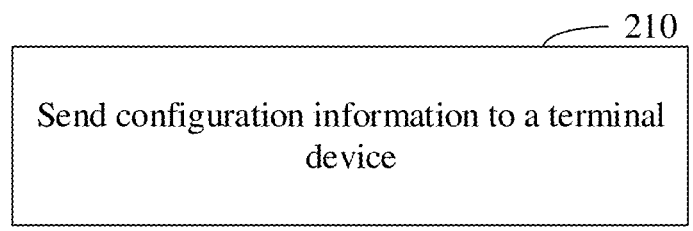
FIG. 3 is a schematic flowchart of a random access method according to a second specific embodiment of the present application.

FIG. 3 is a schematic flowchart of a random access method according to a second specific embodiment of the present application. As shown in FIG. 3, the random access method is applied to a network device, and may include the following act 210.

In act 210, configuration information is sent to a terminal device, wherein the configuration information is used for the terminal device to determine a random access type and initiate a random access.

The implementation process of the random access method may refer to the implementation process of the corresponding acts in any of the random access methods in above first specific embodiment, which will not be repeated here.

Figure 4:
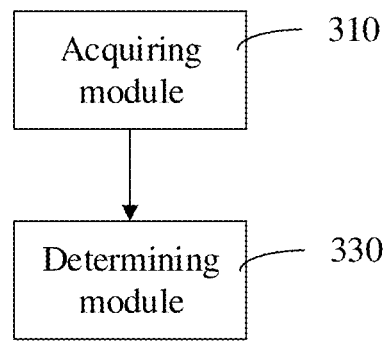
FIG. 4 is a block diagram of a random access apparatus according to a third specific embodiment of the present application.

FIG. 4 is a block diagram of a random access apparatus according to a third embodiment of the present application. As shown in FIG. 4, the apparatus is a terminal device, which may include but is not limited to an acquiring module 310 and a determining module 330.

The acquiring module 310 is configured to acquire configuration information of a network device.

The acquiring module 310 is further configured to acquire position information relative to a target device.

The determining module 330 is configured to, according to the configuration information and the position information, determine a random access type and initiate a random access.

Optionally, the acquiring module 310 is further configured to acquire a resource configuration of a two-step random access and a resource configuration of a four-step random access.

Optionally, the acquired configuration information of the network device further includes one or more ground reference points and a first threshold.

The acquiring module 310 is further configured to measure one or more distances from the terminal device to the one or more ground reference points.

Optionally, the determining module 330 is configured to, when it is determined that the configuration information does not include a resource of a non-contention-based random access, determine the contention-based random access type and initiate the random access according to the one or more distances from the terminal device to the one or more ground reference points.

Optionally, the determining module 330 is further configured to initiate a contention-based two-step random access if it is determined that a distance from the terminal device to at least one ground reference point acquired in the position information is not greater than the first threshold; and initiate a contention-based four-step random access if it is determined that a distance from the terminal device to each of all ground reference points acquired in the position information is greater than the first threshold.

Optionally, the acquired configuration information of the network device further includes a first reference distance and a second threshold.

The random access apparatus further includes: a measuring module 350, configured to measure a first Reference Signal Received Power (RSRP) value.

The determining module 330 is further configured to determine a contention-based random access type and initiate a random access based on the distance from the terminal device to the one or more ground reference points, the first reference distance, and the first RSRP value.

Optionally, the determining module 330 is further configured to determine a distance difference between the distance from the terminal device to the one or more ground reference points and the first reference distance; initiate a contention-based two-step random access if it is determined that a product of at least one distance difference value and the first RSRP value is greater than the second threshold; and initiate a contention-based four-step random access if it is determined that a product of each of all the distance difference values and the first RSRP value is not greater than the second threshold.

Optionally, the acquired configuration information of the network device further includes: a position index list and a third threshold, wherein the position index list includes a position index list for the two-step random access and/or a position index list for a four-step random access.

The acquiring module 310 is further configured to determine a target position of the terminal device according to satellite ephemeris information.

Optionally, the determining module 330 is further configured to determine the contention-based random access type and initiate the random access according to the target position when it is determined that the configuration information does not include a resource of a non-contention-based random access.

Optionally, the determining module 330 is further configured to initiate a contention-based two-step random access if it is determined that the target position is located in a position index list for the two-step random access; initiate a contention-based four-step random access if it is determined that the target position is not located in a position index list for the two-step random access; initiate a contention-based four-step random access if it is determined that the target position is located in the position index list for the four-step random access; and initiate a contention-based two-step random access if it is determined that the target position is not located in the position index list for the four-step random access.

Optionally, the determining module 330 is further configured to initiate a contention-based two-step random access if it is determined that the target position is located in both the position index list for the two-step random access and the position index list for the four-step random access.

Optionally, the acquired configuration information of the network device further includes a fourth threshold.

The measuring module 350 is further configured to measure a second Reference Signal Received Power (RSRP) value corresponding to the target position.

The determining module 330 is further configured to determine a contention-based random access type and initiate a random access based on the target position and the second RSRP value.

Optionally, the determining module 330 is further configured to initiate a contention-based two-step random access if it is determined that the target position is located in a position index list for the two-step random access and that the second RSRP value is not less than the fourth threshold; initiate a contention-based four-step random access if it is determined that the target position is not located in a position index list for the two-step random access or that the second RSRP value is less than the fourth threshold; initiate a contention-based four-step random access if it is determined that the target position is located in the position index list for the four-step random access and the second RSRP value is less than the fourth threshold; and initiate a contention-based two-step random access if it is determined that the target position is not located in the position index list for the four-step random access or that the second RSRP value is not less than the fourth threshold.

Optionally, the determining module 330 is further configured to initiate a contention-based two-step random access if it is determined that the target position is located in both the position index list for the two-step random access and the position index list for the four-step random access and that the second RSRP value is not less than the fourth threshold.

Optionally, the position index list is a beam index list or a cell index list, and the target position includes a beam or a cell.

Optionally, the random access apparatus further includes: an access module 370, configured to, in a case of initiating a contention-based two-step random access, select a Random Access Channel (RACH) resource and a Physical Uplink Shared Channel (PUSCH) resource from a message A (msgA) resource pool of the two-step random access in the configuration information, for msgA transmission.

The access module 370 is further configured to, in a case of initiating a contention-based four-step random access, select a RACH resource from a RACH resource pool of the two-step random access in the configuration information, for first message msg1 transmission.

Optionally, the determining module 330 is further configured to initiate a random access according to the random access type corresponding to a resource of a non-contention-based random access when it is determined that the configuration information includes the resource of the non-contention-based random access.

Optionally, the determining module 330 is further configured to initiate a non-contention-based two-step random access when it is determined that the configuration information includes a msgA resource of the non-contention-based two-step random access.

Optionally, the determining module 330 is further configured to initiate a non-contention-based four-step random access when it is determined that the configuration information includes a RACH resource of the non-contention-based four-step random access.

The implementation process of the functions and roles of various modules and other parts that have not been described or defined in detail in this embodiment may refer to description in the above first embodiment, and will not be repeated here.

Figure 5:
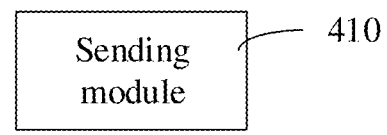
FIG. 5 is a block diagram of a random access apparatus according to a fourth specific embodiment of the present application.

FIG. 5 is a block diagram of a random access apparatus according to a fourth embodiment of the present application. As shown in FIG. 5, the apparatus is a network device, which may include but is not limited to a sending module 410.

The sending module 410 is configured to send configuration information to a terminal device, wherein the configuration information is used for the terminal device to determine a random access type and initiate a random access.

The implementation process of the functions and roles of various modules and other parts that have not been described or defined in detail in this embodiment may refer to description in the above first embodiment and second embodiment, and will not be repeated here.

Figure 6:
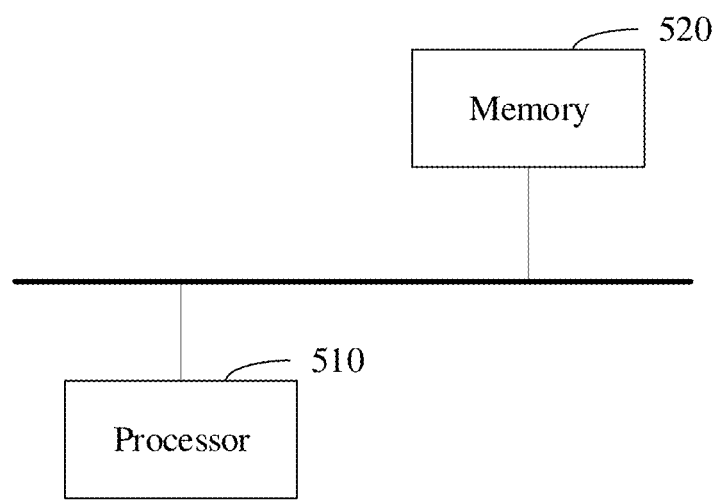
FIG. 6 is a schematic diagram of a hardware structure of a random access apparatus according to a fifth specific embodiment of the present application.

FIG. 6 is a schematic diagram of a hardware structure of a random access apparatus according to a fifth embodiment of the present application. As shown in FIG. 6, the apparatus includes a processor 510 and a memory 520, and the various components of the apparatus are connected with each other for communication through a bus system.

The memory 520 stores a program that may be runnable on the processor 510. When the processor 510 executes the program, part or all of the acts of the random access method in the above first specific embodiment are performed.

The processor 510 may be an independent component or a collective name of multiple processing elements. For example, the processor 610 may be a Central Processing Unit (CPU), an Application Specific Integrated Circuit (ASIC), or one or more integrated circuits configured to implement the methods described above, such as at least one Digital Signal Processor (DSP) or at least one Field Programmable Gate Array (FPGA).

A specific embodiment of the present application further provides a computer readable storage medium. The computer readable storage medium stores a computer program, wherein when the computer program is executed, part or all of acts of the random access method in the above specific implementations are performed.

A specific embodiment of the present application further provides a computer program product, wherein the computer program product is stored in a non-transitory computer readable storage medium, and when the computer program is executed, part or all of acts of the random access method in the above specific implementations are performed. The computer program product may be a software installation package.

A specific embodiment of the present application further provides a chip, which includes a processor for calling and running a computer program from a memory, and a device installed with the chip performs part or all of acts of the random access method in specific embodiments of the methods.

A specific embodiment of the present application further provides a computer program, which when executed, part or all of the acts of the random access method in the above specific implementations are performed.

The acts of the methods or algorithms described in the specific embodiments of the present application may be implemented in hardware or may be implemented by a processor executing software instructions. The software instructions may be composed by corresponding software modules, which may be stored in a Random Access Memory (RAM), a flash memory, a Read Only Memory (ROM), an Erasable Programmable ROM (EPROM), an Electrically EPROM (EEPROM), a register, a hard disk, a removable hard disk, a Compact Disc Read Only Memory (CD-ROM), or a storage medium in any other form well-known in the art. An exemplary storage medium is coupled to a processor such that the processor can read information from the storage medium, and can write information to the storage medium. Of course, the storage medium may be a component of the processor. The processor and the storage medium may be located in an Application Specific Integrated Circuit (ASIC). In addition, the ASIC may be located in an access network device, a target network device, or a core network device. Of course, the processor and the storage medium may in the access network device, the target network device, or the core network device as discrete components.

Those skilled in the art should realize that in one or more examples described above, the functions described in the specific embodiments of the present application may be implemented in whole or in parts through software, hardware, firmware, or any combination thereof. When the embodiments are implemented through software, they may be implemented in whole or in part in a form of a computer program product. The computer program product includes one or more computer instructions. When the computer program instructions are loaded and executed on a computer, the flows or functions according to the specific embodiments of the present application are generated in whole or in parts. The computer may be a general purpose computer, a special purpose computer, a computer network, or another programmable apparatus. The computer instructions may be stored in a computer-readable storage medium, or be transmitted from one computer-readable storage medium to another computer-readable storage medium. For example, the computer instructions may be transmitted from a website site, a computer, a server, or a data center to another website site, computer, server, or data center through a wired mode (e.g., a coaxial cable, an optical fiber, a Digital Subscriber Line (DSL)) or a wireless mode (e.g., infrared emission, radio, microwave). The computer-readable storage medium may be any available medium that the computer can access, or a data storage device such as an integrated server or data center that includes one or more available media. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), or the like.

The purpose, technical solutions, and beneficial effects of the specific implementations of the present application are further described in detail in specific implementations described above. It should be understood that the above is only the specific implementations of the embodiments of the present application and is not intended to limit the protection scope of the specific implementations of the present application. Any modification, equivalent substitution, and improvement made based on the technical solutions of the specific implementations of the present application should be included in the protection scope of the embodiments of the present application.

It should be understood that the present application is not limited to specific structures already described above and shown in the drawings, and various modifications and changes may be made without departing from the scope of the present application. The scope of the present application is limited only by the appended claims.

The invention claimed is:

1. A random access method, applied to a terminal device, comprising:
acquiring configuration information of a network device;
acquiring position information relative to a target device; and determining, according to the configuration information and the position information, a random access type, and initiating a random access;
wherein acquiring the configuration information of the network device comprises:
acquiring a resource configuration of a two-step random access and a resource configuration of a four-step random access; wherein the acquired configuration information of the network device comprises: a position index list and a third threshold, wherein the position index list comprises a position index list for a two-step random access and/or a position index list for a four-step random access;
acquiring the position information relative to the target device comprises: determining a target position of the terminal device according to satellite ephemeris information;
wherein the determining, according to the configuration information and the position information, the random access type and initiating the random access comprises:
when determining that the configuration information does not comprise a resource of a non-contention-based random access, according to the target position, determining a contention-based random access type and initiating the random access;
wherein when determining that the configuration information does not comprise the resource of the non-contention-based random access, according to the target position, determining the contention-based random access type and initiating the random access comprises:
initiating a contention-based two-step random access if determining that the target position is located in the position index list for the two-step random access;
initiating a contention-based four-step random access if determining that the target position is not located in the position index list for the two-step random access;
initiating the contention-based four-step random access if determining that the target position is located in the position index list for the four-step random access; and
initiating the contention-based two-step random access if determining that the target position is not located in the position index list for the four-step random access;
or
when determining that the configuration information does not comprise the resource of the non-contention-based random access, according to the target position, determining the contention-based random access type and initiating the random access comprises:
initiating a contention-based two-step random access if determining that the target position is located in both the position index list for the two-step random access and the position index list for the four-step random access;
wherein the acquired configuration information of the network device further comprises: a fourth threshold;
the method further comprises:
measuring a second Reference Signal Received Power (RSRP) value corresponding to the target position; and
based on the target position and the second RSRP value, determining the contention-based random access type and initiating the random access; wherein based on the target position and the second RSRP value, determining the contention-based random access type and initiating the random access comprises:
initiating a contention-based two-step random access if determining that the target position is located in the position index list for the two-step random access and the second RSRP value is not less than the fourth threshold;
initiating a contention-based four-step random access if determining that the target position is not located in the position index list for the two-step random access or the second RSRP value is less than the fourth threshold;
initiating the contention-based four-step random access if determining that the target position is located in the position index list for the four-step random access and the second RSRP value is less than the fourth threshold; and
initiating the contention-based two-step random access if determining that the target position is not located in the position index list for the four-step random access or the second RSRP value is not less than the fourth threshold;
or
based on the target position and the second RSRP value, determining the contention-based random access type and initiating the random access comprises:
initiating a contention-based two-step random access if determining that the target position is located in both the position index list for the two-step random access and the position index list for the four-step random access and that the second RSRP value is not less than the fourth threshold.

2. The method of claim 1, wherein the acquired configuration information of the network device further comprises one or more ground reference points and a first threshold;
acquiring the position information relative to the target device comprises measuring one or more distances from the terminal device to the one or more ground reference points.

3. The method of claim 2, wherein determining, according to the configuration information and the position information, the random access type, and initiating the random access comprises:
when determining that the configuration information does not comprise a resource of a non-contention-based random access, according to the one or more distances from the terminal device to the one or more ground reference points, determining a contention-based random access type and initiating the random access;
wherein when determining that the configuration information does not comprise the resource of the non-contention-based random access, according to the one or more distances from the terminal device to the one or more ground reference points, determining the contention-based random access type and initiating the random access comprises:
initiating a contention-based two-step random access if determining that a distance from the terminal device to at least one ground reference point acquired in the position information is not greater than the first threshold; and
initiating a contention-based four-step random access if determining that a distance from the terminal device to each of all ground reference points acquired in the position information is greater than the first threshold.

4. The method of claim 3, wherein the acquired configuration information of the network device further comprises a first reference distance and a second threshold;
the method further comprises:
measuring a first Reference Signal Received Power (RSRP) value;

based on the one or more distances from the terminal device to the one or more ground reference points, the first reference distance, and the first RSRP value, determining the contention-based random access type and initiating the random access;

wherein based on the one or more distances from the terminal device to the one or more ground reference points, the first reference distance, and the first RSRP value, determining the contention-based random access type and initiating the random access comprises:

determining a distance difference between the one or more distances from the terminal device to the one or more ground reference points and the first reference distance;

initiating the contention-based two-step random access if determining that a product of at least one distance difference value and the first RSRP value is greater than the second threshold; and initiating the contention-based four-step random access if determining that a product of each of all distance difference values and the first RSRP value is not greater than the second threshold.

5. The method of claim 1, wherein the position index list is a beam index list or a cell index list, and the target position comprises a beam or a cell.

6. A random access apparatus, comprising:

a processor, configured to acquire configuration information of a network device;

wherein the processor is further configured to acquire position information relative to a target device;

the processor is further configured to, according to the configuration information and the position information, determine a random access type and initiate a random access; and the processor is further configured to acquire a resource configuration of a two-step random access and a resource configuration of a four-step random access;

wherein the acquired configuration information of the network device comprises: a position index list and a third threshold, wherein the position index list comprises a position index list for a two-step random access and/or a position index list for a four-step random access;

the processor is further configured to determine a target position of the terminal device according to satellite ephemeris information;

wherein the processor is further configured to, determine the contention-based random access type and initiate the random access according to the target position when determining that the configuration information does not comprise a resource of a non-contention-based random access;

wherein the processor is further configured to, initiate a contention-based two-step random access if determining that the target position is located in the position index list for the two-step random access;

initiate a contention-based four-step random access if determining that the target position is not located in the position index list for the two-step random access;

initiate the contention-based four-step random access if determining that the target position is located in the position index list for the four-step random access; and initiate the contention-based two-step random access if determining that the target position is not located in the position index list for the four-step random access;

or wherein the processor is further configured to, initiate a contention-based two-step random access if determining that the target position is located in both the position index list for the two-step random access and the position index list for the four-step random access;

wherein the acquired configuration information of the network device further comprises: a fourth threshold;

the processor is further configured to measure a second Reference Signal Received Power (RSRP) value corresponding to the target position; and the processor is further configured to determine the contention-based random access type and initiate the random access based on the target position and the second RSRP value;

wherein the processor is further configured to, initiate a contention-based two-step random access if determining that the target position is located in the position index list for the two-step random access and the second RSRP value is not less than the fourth threshold;

initiate a contention-based four-step random access if determining that the target position is not located in the position index list for the two-step random access or the second RSRP value is less than the fourth threshold;

initiate the contention-based four-step random access if determining that the target position is located in the position index list for the four-step random access and the second RSRP value is less than the fourth threshold; and initiate the contention-based two-step random access if it is determined that the target position is not located in the position index list for the four-step random access or the second RSRP value is not less than the fourth threshold;

or wherein the processor is further configured to, initiate a contention-based two-step random access if determining that the target position is located in both the position index list for the two-step random access and the position index list for the four-step random access and that the second RSRP value is not less than the fourth threshold.

7. The apparatus of claim 6, wherein the acquired configuration information of the network device further comprises one or more ground reference points and a first threshold;

the processor is further configured to measure one or more distances from the apparatus to the one or more ground reference points.

8. The apparatus of claim 7, wherein the processor is further configured to, when determining that the configuration information does not comprise a resource of a non-contention-based random access, determine a contention-based random access type and initiate the random access according to the one or more distances from the apparatus to the one or more ground reference points;

wherein the processor is further configured to, initiate a contention-based two-step random access if determining that a distance from the apparatus to at least one ground reference point acquired in the position information is not greater than the first threshold; and initiate a contention-based four-step random access if determining that a distance from the apparatus to each of all ground reference points acquired in the position information is greater than the first threshold.

9. The apparatus of claim 8, wherein the acquired configuration information of the network device further comprises a first reference distance and a second threshold;
the processor is configured to measure a first Reference Signal Received Power (RSRP) value;
the processor is further configured to determine the contention-based random access type and initiate the random access based on the one or more distances from the apparatus to the one or more ground reference points, the first reference distance, and the first RSRP value;
the processor is further configured to,
determine a distance difference between the one or more distances from the apparatus to the one or more ground reference points and the first reference distance;
initiate the contention-based two-step random access if determining that a product of at least one distance difference value and the first RSRP value is greater than the second threshold; and
initiate the contention-based four-step random access if determining that a product of each of all distance difference values and the first RSRP value is not greater than the second threshold.

10. The apparatus of claim 6, wherein the position index list is a beam index list or a cell index list, and the target position comprises a beam or a cell.

11. A chip, comprising: a processor, configured to call and run a computer program from a memory to enable an apparatus disposed with the chip to perform the random access method according to claim 1.

* * * * *